United States Patent [19]

Hatakeyama et al.

[11] Patent Number: 4,637,960

[45] Date of Patent: Jan. 20, 1987

[54] SPACER FOR FURNACE BRAZING HAVING LOW WETTABILITY COATING THEREON

[75] Inventors: Toshio Hatakeyama, Kawagoe; Toshihiko Yoshio, Hidakamachi, both of Japan

[73] Assignee: Honda Giken Kogyo Kabushiki Kaisha, Tokyo, Japan

[21] Appl. No.: 670,836

[22] Filed: Nov. 13, 1984

[51] Int. Cl.⁴ .............................................. B32B 9/00
[52] U.S. Cl. .................................. 428/469; 428/472; 428/688
[58] Field of Search ..................... 428/469, 472, 688

[56] References Cited

U.S. PATENT DOCUMENTS

| | | | |
|---|---|---|---|
| 3,052,590 | 9/1962 | Maros et al. | 428/469 |
| 3,057,445 | 10/1962 | Bronnes | 428/469 |
| 3,136,656 | 6/1964 | Elliott | 428/469 |
| 3,186,867 | 6/1965 | Forslund et al. | 428/469 |
| 3,662,144 | 5/1972 | De Haeck | 219/73 |
| 4,223,199 | 9/1980 | Steigerwald et al. | 219/121 |

*Primary Examiner*—Edith Buffalow
*Attorney, Agent, or Firm*—Armstrong, Nikaido, Marmelstein & Kubovcik

[57] ABSTRACT

A spacer for brazing having a main body made of a steel plate such as a hot rolled steel plate, a stainless steel plate or the like and a coating provided on the surfaces of the main body by a flame spraying process such as a metal spraying process or a plasma spraying process. The coating is an inorganic substance which is low in wettability in relation to a brazing filler metal. When the brazing filler metal is a copper series one, the inorganic substance is a metal oxide such as alumina, zirconia, a mixture of zirconia and titania, magnesium zirconate or the like, or an inorganic nitride such as boron nitride or the like.

7 Claims, 2 Drawing Figures

SPACER FOR FURNACE BRAZING HAVING LOW WETTABILITY COATING THEREON

BACKGROUND OF THE INVENTION

This invention relates to a spacer for brazing used for spacing apart plural half-finished products, each comprising at least two plate-shaped workpieces layered together and bound by a brazing filler metal, are to be put one upon another and introduced into a brazing furnace.

In general, a spacer of this kind is used by inserting it between adjacent layers of the half-finished products in order to prevent fused brazing filler metal in a furnace from flowing into a gap between the adjacent half-finished products and binding the products together. In this case, if a usual steel plate is used as the spacer, a problem occurs because steel is high in wettability in relation to the brazing filler metal. Consequently, the spacer and the product are liable to be bound together by the fused brazing filler metal which flows into a gap therebetween.

Accordingly, it has been usual hitherto that a ceramic plate such as an alumina plate is used for the spacer. However, this kind of plate is defective in that it is weak in durability to thermal shock and cannot withstand repeated uses. Accordingly, alumina plates are considered to be consumable articles. This results in a lowering in productivity and a rise in cost.

OBJECTS AND SUMMARY OF THE INVENTION

It is an object of the present invention to provide a spacer for furnace brazing to be inserted between half-finished products to keep them from being bound together by any brazing filler material flowing into a gap therebetween.

It is a further object to provide a spacer which is durable in respect to repeated thermal shocks.

It is a still further object to provide a spacer which will not be bound to the half-finished objects between which it is inserted by any brazing filler material which may flow thereunto.

These and other objects are obtained by a spacer having a main body made of a steel material selected from the group consisting of hot rolled steel and stainless steel and a coating on both sides thereof of an inorganic substance which is low in wettability in relation to a brazing filler material. The coating can be applied by a flame spraying process such as a metal spraying process or by a plasma jet spraying process. The coating can be a metal oxide or an inorganic nitride. An undercoating to improve bonding of the coating to the main body can be used and can be nickel chrome, nickel aluminide or the like.

DETAILED DESCRIPTION OF PREFERRED EMBODIMENTS

Figure 1:
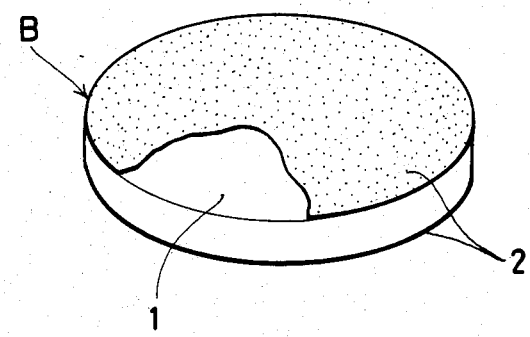
FIG. 1 is a perspective view, partly omitted, of one embodying example of this invention.
Figure 2:
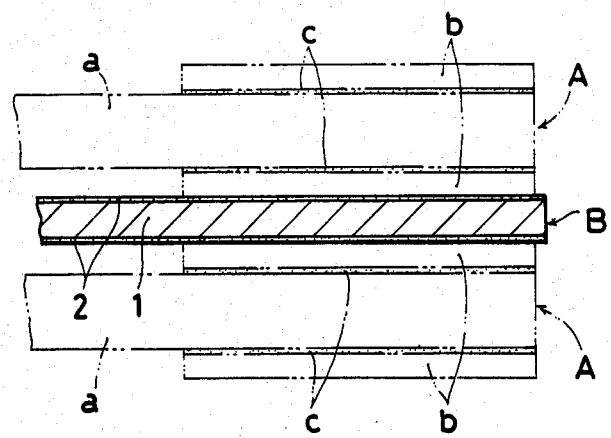
FIG. 2 is an enlarged sectional side view of a part thereof for explaining the manner of its use.

Embodying examples of this invention will now be explained with reference to the accompanying drawing:

Referring to FIG. 2, half-finished products A for a brake disk are shown having pad slide contact rings b made of stainless steel positioned on each of both surfaces of a circular steel plate a and held thereto by copper series brazing filler metal pieces c. A plurality of such half-finished products A are layered together with respective spacers B each inserted between the adjacent products A.

This invention resides in each of these spacers B. Namely, a spacer main body 1 which is made of a hot roller steel material (SPN, SPH or the like), a stainless steel material (SUS) or the like is formed into a plate. The plate is provided on each surface thereof, by a flame spraying process such as a metal spraying process, a plasma spraying process or the like, with a coating 2 of an inorganic substance which is low in wettability in relation to the brazing filler metal c.

The spacer main body 1 can be made of a cold roller steel material. However, cold roller steel is comparatively large in thermal bending or warping when it is heated in the furnace. Thus, it is preferable to use hot roller steel or the stainless steel because the thermal deformation thereof is comparatively small.

In general, a copper series material is used as the brazing filler metal c. In such a case, the inorganic substance 2 which is low in wettability in relation to the brazing filler metal c can be an oxide such as alumina, zirconia, a mixture of zirconia and titania, magnesium zirconate, etc., or a nitride such as boron nitride or the like. From an overall evaluation of performance and cost, alumina, especially, gray alumina (94% $Al_2O_3$-2.5% $TiO_2$) is most advantageous.

If the coating 2 is formed by the flame spraying process, a porous coating can be obtained having innumerable pores among the fused particles sprayed. Thermal stress can be easily absorbed in those pores among the particles. In this manner, the durability of the coating 2 to withstand repeated heating and cooling can be increased. If, however, the coating 2 is too thick, it tends to crack. Accordingly, it is preferable that the coating be about 20–50 in thickness.

The coating 2 can be formed directly on the spacer main body 1. However, it is preferable that, for increasing the bonding strength between the two, the main body 1 is provided by a metal spraying process with an undercoating of nickel chrome, nickel aluminide or the like, and then the coating 2 is formed thereover.

Brazing tests were carried out with spacers according to the invention used as illustrated in FIG. 2. The results thereof were as follows:

Test 1

A spacer main body 1 was made of hot rolled steel (SPH) and was 1.0 mm in thickness. The surfaces were sandblasted. A coating 2 of alumina of 20–50 micron in thickness was plasma jet sprayed on both sides. The resultant spacers were used as an insertion for brazing the half-finished products. Some of the fused brazing filler metal flowed out onto the spacer, but was repelled by the coating 2 and did not flow into the gap between the half-finished product and the spacer. Thus, the brazing of the component members of the half-finished products was carried out in a good condition free from one another and the spacers.

Test 2

A spacer main body 1 was made of a stainless steel material (SUS 310) and was 0.6 mm in thickness. It was provided with a coating 2 in almost the same manner as above. The resulttant spacer was used as an insertion for brazing the half-finished products. It has been found that the brazing of the half-finished products can be carried out in a good condition in almost the same manner as above.

Thus, according to this invention, a spacer main body made of a steel plate such as a hot rolled steel plate, a stainless steel plate or the like is provided on its surface, by a flame spraying process, with a coating of an inorganic substance which is low in wettability in relation to a brazing filler metal, so that fused brazing filler metal is not introduced into a gap between the spacer and the half-finished product and does not bind them together. In addition, when the spacer main body is a hot rolled plate or a stainless steel, thermal warping is comparatively small, and thereby a good brazing can be carried out without having any bad influence on the product.

Furthermore, dissimilary to the conventional ceramic spacer, the spacer of the present invention is durable to repeated uses thereof, so that there can be obtained an improvement in productivity and lowering in manufacturing cost.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A spacer for use between articles being brazed for preventing a brazing filler metal from flowing from one of said articles to another of said articles when said articles are being brazed, said spacer comprising:
    a main body made of a steel plate selectd from the group consisting of hot rolled steel and stainless steel; and
    a coating on a top side surface and a bottom side surface of said main body of an inorganic substantce which is low in wettability in relation to the brazing filler metal and repelling said brazing filler metal during brazing for preventing one of said articles at one side of said spacer from being brazed to said spacer and to another of said articles.

2. The spacer of claim 1, wherein the coating is applied by a process selected from the group consisting of flame spraying, metal spraying, and plasma jet spraying.

3. The spacer of claim 2, wherein the brazing filler metal is a copper series metal and the inorganic substance is selected from the group consisting of metal oxides and inorganic nitrides.

4. The spacer of claim 3, wherein the inorganic nitride is boron nitride.

5. The spacer of claim 3, wherein the metal oxide is selected from the group consisting of alumina, zirconia, titania, magnesium zirconate, and mixtures thereof.

6. The spacer of claim 5, wherein the metal oxide is gray alumina.

7. The spacer of claim 1, wherein the main body is about 0.6–1.0 mm in thickness and the coating has a thickness of 20–50 microns.

* * * * *